(12) United States Patent
Majee

(10) Patent No.: US 7,978,598 B1
(45) Date of Patent: Jul. 12, 2011

(54) CONNECTION REPLICATION

(75) Inventor: Sumandra Majee, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 2428 days.

(21) Appl. No.: 10/123,366

(22) Filed: Apr. 16, 2002

Related U.S. Application Data

(60) Provisional application No. 60/360,826, filed on Mar. 1, 2002.

(51) Int. Cl.
*H04L 1/00* (2006.01)
(52) U.S. Cl. ........................ 370/225; 370/395.2; 370/428
(58) Field of Classification Search .................. 370/216, 370/219, 220–221, 242, 254, 392, 400, 401, 370/475, 225, 395.2, 428
See application file for complete search history.

(56) References Cited

U.S. PATENT DOCUMENTS

| | | | | |
|---|---|---|---|---|
| 5,812,773 A * | 9/1998 | Norin | ............................. | 709/204 |
| 5,812,793 A * | 9/1998 | Shakib et al. | .................. | 709/201 |
| 5,974,114 A * | 10/1999 | Blum et al. | ......................... | 379/9 |
| 6,006,264 A * | 12/1999 | Colby et al. | ..................... | 709/226 |
| 6,148,410 A * | 11/2000 | Baskey et al. | ...................... | 714/4 |
| 6,205,557 B1 * | 3/2001 | Chong et al. | ........................ | 714/4 |
| 6,314,095 B1 * | 11/2001 | Loa | ............................... | 370/352 |
| 6,405,236 B1 * | 6/2002 | Nieratschker | .................. | 709/200 |
| 6,718,387 B1 * | 4/2004 | Gupta et al. | ..................... | 709/226 |
| 6,742,044 B1 * | 5/2004 | Aviani et al. | .................... | 709/235 |
| 6,772,413 B2 * | 8/2004 | Kuznetsov | ..................... | 717/136 |
| 6,910,148 B1 * | 6/2005 | Ho et al. | ............................ | 714/4 |
| 6,985,956 B2 * | 1/2006 | Luke et al. | ..................... | 709/229 |
| 7,003,794 B2 * | 2/2006 | Arye | ............................... | 725/100 |
| 7,039,008 B1 * | 5/2006 | Howes et al. | .................. | 370/220 |
| 7,093,160 B2 * | 8/2006 | Lau et al. | ........................... | 714/11 |
| 7,212,527 B2 * | 5/2007 | Shah et al. | ...................... | 370/389 |
| 7,257,706 B1 * | 8/2007 | Zucker | ........................... | 713/163 |
| 7,607,062 B2 * | 10/2009 | Grove et al. | ................... | 714/748 |
| 7,672,223 B2 * | 3/2010 | Majee et al. | .................... | 370/216 |
| 7,710,995 B2 * | 5/2010 | Capone et al. | ................. | 370/438 |
| 7,751,311 B2 * | 7/2010 | Ramaiah et al. | .............. | 370/218 |
| 7,831,731 B2 * | 11/2010 | Tang et al. | ...................... | 709/237 |
| 2002/0107966 A1 * | 8/2002 | Baudot et al. | .................. | 709/227 |
| 2002/0176355 A1 * | 11/2002 | Mimms et al. | ................. | 370/216 |
| 2002/0188730 A1 * | 12/2002 | Tang et al. | ...................... | 709/227 |
| 2002/0188740 A1 * | 12/2002 | Tang et al. | ...................... | 709/230 |
| 2002/0188753 A1 * | 12/2002 | Tang et al. | ...................... | 709/237 |

(Continued)

OTHER PUBLICATIONS

Distributed worm simulation with a realistic internet model; S Wei, J Mirkovic - 2005.*

(Continued)

*Primary Examiner* — Salman Ahmed
(74) *Attorney, Agent, or Firm* — Patterson & Sheridan, LLP

(57) ABSTRACT

A standby content switch module maintains a connection after failure of the active CSM by maintaining a replicate connection state of the connection state of the active CSM. The active CSM transmits a replicate TCP SYN segment to the standby CSM to replicate a connection state on the standby CSM. The replicate SYN is constructed to appear to originate from the client originating the connection to the active CSM. The replicate SYN further includes encoded information enabling the standby CSM to distinguish the replicate SYN from an actual SYN. The replicate SYN frame contains information needed to create a connection state on the standby CSM that is a replica of the connection state on the active CSM.

27 Claims, 15 Drawing Sheets

U.S. PATENT DOCUMENTS

| | | | | |
|---|---|---|---|---|
| 2002/0191600 A1* | 12/2002 | Shah et al. | ................... | 370/389 |
| 2002/0198981 A1* | 12/2002 | Corl et al. | ..................... | 709/224 |
| 2004/0008693 A1* | 1/2004 | Grove et al. | ............. | 370/395.52 |
| 2005/0265346 A1* | 12/2005 | Ho et al. | ...................... | 370/392 |
| 2006/0262716 A1* | 11/2006 | Ramaiah et al. | ............. | 370/216 |
| 2008/0310420 A1* | 12/2008 | Aloni et al. | ............. | 370/395.52 |

OTHER PUBLICATIONS

On-the-fly TCP path selection algorithm in access link load balancing; Ying-Dar Lin; Shih-Chiang Tsao; Un-Pio Leong; Global Telecommunications Conference, 2004.*

* cited by examiner

Prior Art

CONNECTION REPLICATION

CROSS REFERENCE TO RELATED APPLICATIONS

This application claims the benefit of priority to U.S. Provisional Application Ser. No. 60/360,826, filed Mar. 1, 2002 and entitled "Methods and Apparatus for Connection Table Replication," the teachings of which are hereby incorporated by reference in their entirety.

FIELD OF THE INVENTION

The present invention relates, in general, to network switches, and more particularly to network switches having fault tolerance.

BACKGROUND OF THE INVENTION

The state of the server system availability on the Internet has become an important factor with the increasing number of e-commerce centers and a steep rise in user traffic to web farms. Content switch modules (CSMs) are server load balancing devices capable of supporting large numbers of servers and server farms. Current CSM technology has a basic fault tolerance capability in which a standby CSM monitors an active CSM for failure. When the standby CSM detects a failure of the active CSM, the standby CSM takes over the server load balancing responsibility of the active CSM.

The CSM switches are Layer 5-7 switches using the Open System Interconnection (OSI) standard model. CSM switches are also referred to as "content" switches. CSM switches are specifically designed for handling web-based IP-traffic, i.e., HTTP. CSM switches provide a robust front-end for Web server farms and cache clusters with unique features for e-commerce, Web hosting, and content delivery.

Web traffic is different from classic IP-based LAN data traffic. First, Web traffic is largely asymmetric, with much larger flows back out to the users from the servers, than the inward-bound flows, such as, a search request followed by a download of results. Second, sessions are constantly brought up and torn down, often with little data involved but with many, many concurrent connections. Finally, there are sudden large session and data spikes at times when popular content is released to the Web. Web switching requires the ability to parse each content request and classify flows using URLs, host tags, and cookies so that each request can be isolated and treated according to business policies defined and stored in a central database.

Not only is the CSM switch designed to handle Web traffic, but it also designed to optimize Web traffic flows by finding the optimal connection to a server or cache device. In turn, this means adding sufficient intelligence into the device in order for it to be able to continually analyze traffic flows and direct that traffic accordingly. Simply knowing basic source and destination data is not enough. To optimize Web traffic, the switch needs to know the content being requested and generated, that is, the CSM switch switches based on the web content. A CSM is able to look inside a URL and switch traffic based on any element, for example, a file extension, within that URL. Cookie content is also analyzed and used for switching.

By knowing what kind of traffic is being requested, the CSM can go beyond basic load balancing of servers and start actively optimizing the entire back-end of the network for the data flows being received. For example, certain types of traffic, such as real audio or video content, require more guarantees of bandwidth availability in order to work sufficiently well compared with "standard" browsing. Also, in this mode of operation, load balancing requires all content to be replicated between all load-balanced servers. This is because load-balanced servers cannot explicitly direct traffic based on the content being requested.

To handle web traffic, the CSM first sets up a traffic "flow", identifying the specific user and content being requested in order for it to apply the correct policy and route the data request to the best destination point at that given moment in time. Once a flow is established the switch can invoke wire-speed forwarding of that traffic for that session. Throughout the session, the switch monitors the traffic and can provide statistical and management information as a result, such as having ability to aggregate per-flow statistics and report events and alarms for further action.

TCP is an abbreviation of Transmission Control Protocol, one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent.

The TCP/IP protocol suite comprises two protocols that correspond roughly to the OSI Transport and Session Layers; these protocols are called the Transmission Control Protocol and the User Datagram Protocol (UDP).

TCP provides a virtual circuit (connection-oriented) communication service across the network. TCP includes rules for formatting messages, establishing and terminating virtual circuits, sequencing, flow control, and error correction. Most of the applications in the TCP/IP suite operate over the reliable transport service provided by TCP.

UDP provides an end-to-end datagram (connectionless) service. Some applications, such as those that involve a simple query and response, are better suited to the datagram service of UDP because there is no time lost to virtual circuit establishment and termination. UDP's primary function is to add a port number to the IP address to provide a socket for the application.

SUMMARY OF THE INVENTION

Current CSM technology does not support maintaining the client/server connections existing at the time of failure. This causes a long service loss for customers who have long-lived, persistent TCP channels through CSM. It is desirable to have a method and apparatus for maintaining service to customers.

Embodiments of the present invention significantly overcome such deficiencies and provide mechanisms and techniques for establishing a replicate connection in a standby switch such that connections are maintained after failover of a first content switch module to a standby content switch module. The standby CSM maintains a connection after failure of the active CSM by maintaining a replicate connection state of the connection state of the active CSM. The active CSM transmits a replicate TCP SYN segment to the standby CSM to replicate a connection state on the standby CSM. The replicate SYN is constructed to appear to originate from the client originating the connection to the active CSM. The replicate SYN further includes encoded information enabling the standby CSM to distinguish the replicate SYN from an actual SYN. In one embodiment of the invention, this additional encoded information is based on the source MAC and the private link between the active CSM and the standby CSM. All replication traffic arrives over the private link and thereby serves as an alert to the standby CSM that a data segment is a replication segment. The replicate SYN frame contains information needed to create a connection state on the standby CSM that is a replica of the connection state on the active CSM.

More specifically, embodiments of the invention provide methods and apparatus that replicate a connection in a content switch. One such method embodiment comprises the step of transmitting a replication request message to a second content switch module. The method then transmits the replication request message to a second content switch module. The method then creates a second connection in the second content switch module that is a replication of the first connection.

In another embodiment of the invention, the step of creating a replication request message further comprises the step of creating a TCP SYN packet. In another embodiment of the invention the step of creating a TCP SYN packet further comprises the step of providing connection state replication data in the TCP SYN packet. In another embodiment of the invention, a time-out period for the second connection state is established. In another embodiment of the invention, the first content switch module sends a periodic refresh message to the second content switch module to maintain the replicate connection. In another embodiment of the invention, the second content switch updates the time-out period in response to the refresh message. In another embodiment of the invention, the replication request message is transmitted over a private link between the first content switch and the second content switch modules. In another embodiment of the invention, the first content switch closes its connection and transmits a replicate reset message to the second content switch which tears down the replicate connection in response to receiving the replicate reset message. In another embodiment of the invention, the replication request message includes a replication identifier.

In another method of the invention, a content switch generates a replication command in order to replicate a connection for fault tolerance by detecting a connection needing replication. The content switch then creates a replication request message containing data for replicating the detected connection and transmits the replication request message to a second switch capable of establishing a replicate connection in response to said replication request message. In another embodiment of the invention, the content switch sends a refresh message to the second switch to maintain the replicate connection. In another embodiment of the invention, the method detects a reset message for the connection. Then the first content switch transmits a replicate reset message to the second content switch notifying the second content switch that the replicate connection may be torn down. The embodiment further comprises including a replication identifier in the replication request message. A second replication request message including a second replication identifier may then be used to establish a second replicate connection.

In another method of the invention, a replicate connection is made in a standby content switch by receiving a connection request message. The standby switch then determines whether the connection request message is a replication request message. If the message is a replication request message, then the standby switch creates a replicate connection in response to the replication data in the connection request message. Another embodiment of the invention comprises establishing a time-out period for the replicate connection. Another embodiment of the invention further comprises receiving a replicate reset message and tearing down the replicate connection in response to the reset message.

DETAILED DESCRIPTION

The standby CSM maintains a connection after failure of the active CSM by maintaining a replicate connection state of the connection state of the active CSM. The active CSM transmits a replicate TCP SYN segment to the standby CSM to replicate a connection state on the standby CSM. The replicate SYN is constructed to appear to originate from the client originating the connection to the active CSM. The replicate SYN further includes encoded information enabling the standby CSM to distinguish the replicate SYN from an actual SYN. In one embodiment of the invention, this additional encoded information is based on the source MAC and the private link between the active CSM and the standby CSM. All replication traffic arrives over the private link and thereby serves as an alert to the standby CSM that a data segment is a replication segment. The replicate SYN frame contains information needed to create a connection state on the standby CSM that is a replica of the connection state on the active CSM.

Figure 1:
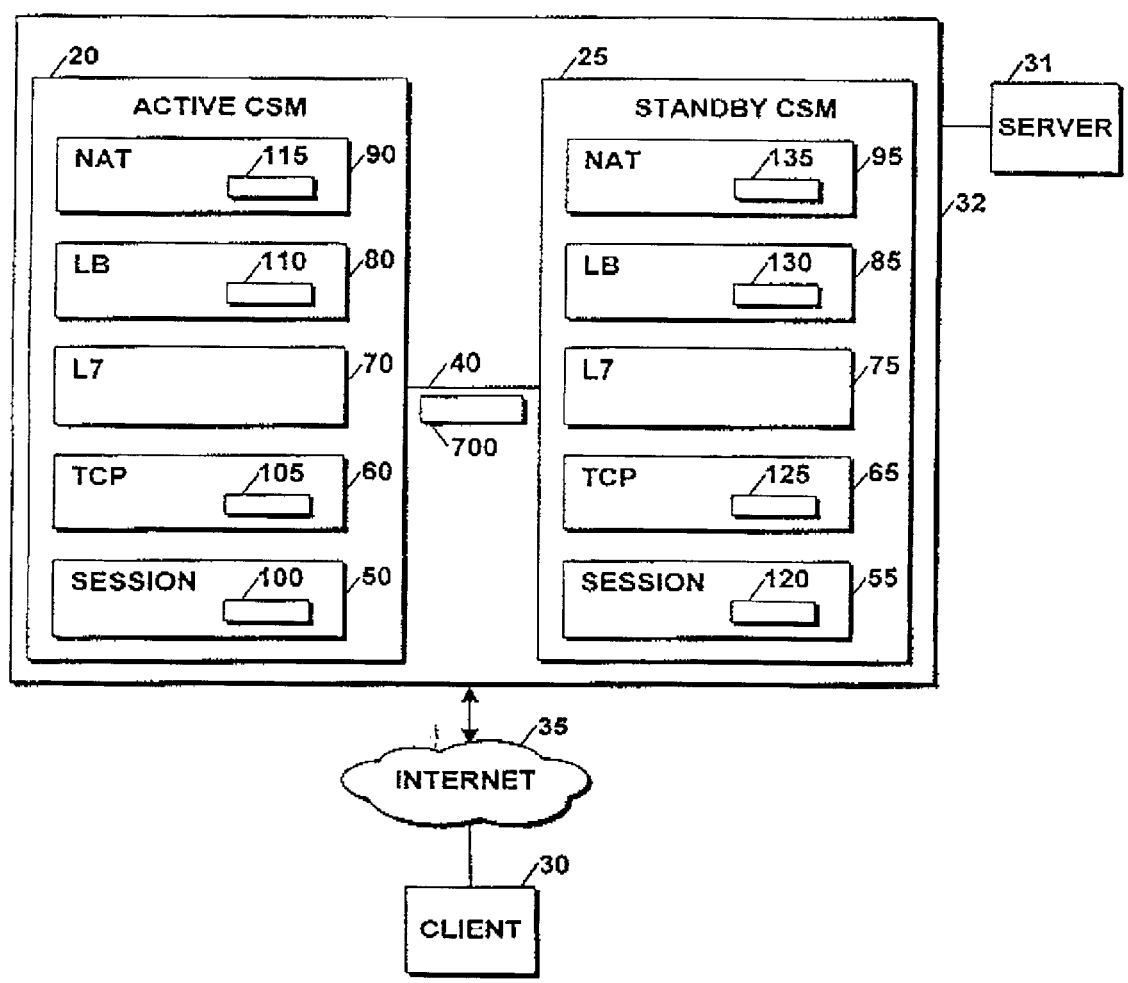
FIG. 1 is a block diagram of an active CSM system and a standby CSM in a network according to the principles of the present invention.

FIG. 1 shows an example of an active CSM 20 and a standby CSM 25 connecting a server 31 to a client 30 through the Internet 35 according to principles of the present invention. The active CSM 20 and standby CSM 25 are connected to each other by a private link 40. In a preferred embodiment of the invention, the link 40 is a vlan, however, the virtual lan link could be established over any type of physical link. Together, the active CSM 20 and standby CSM 25 form a fault tolerant switch 32.

In this example, each CSM 20, 25 has five modules, a session module 50, 55, a TCP module 60, 65, an L7 module 70, 75, a load balancing (LB) module 80, 85, and a NAT module 90, 95. The session modules 50, 55 maintain data about established connections. The TCP modules 60, 65 handle TCP processes. The L7 modules 70, 75 handle layer 7 content switching processes. The LB modules 80, 85 handle load balancing processes. The NAT modules 90, 95 handles network address translation between the internal network addresses and the external network addresses.

A connection state in the active CSM 20 in this example, is distributed among the session 50, TCP 60, LB 80 and NAT 90 modules. Each of these modules 50, 60, 80, 90 contains a part of the connection state 100, 105, 110, 115. In present invention, the standby CSM 25 maintains a connection after failure of the active CSM 20 by maintaining a replicate connection state of the connection state of the active CSM 20. The replicate connection state 120, 125, 130 and 135 is distributed among the standby CSM session 55, TCP 65, LB 85 and NAT 95 modules. In one embodiment of the invention, only selected connections are replicated in the standby CSM. FTP connections, for example, are typically replicated. In alternative embodiments of the invention, it is possible to replicate all primary CSM connections in the standby CSM.

Figure 2:
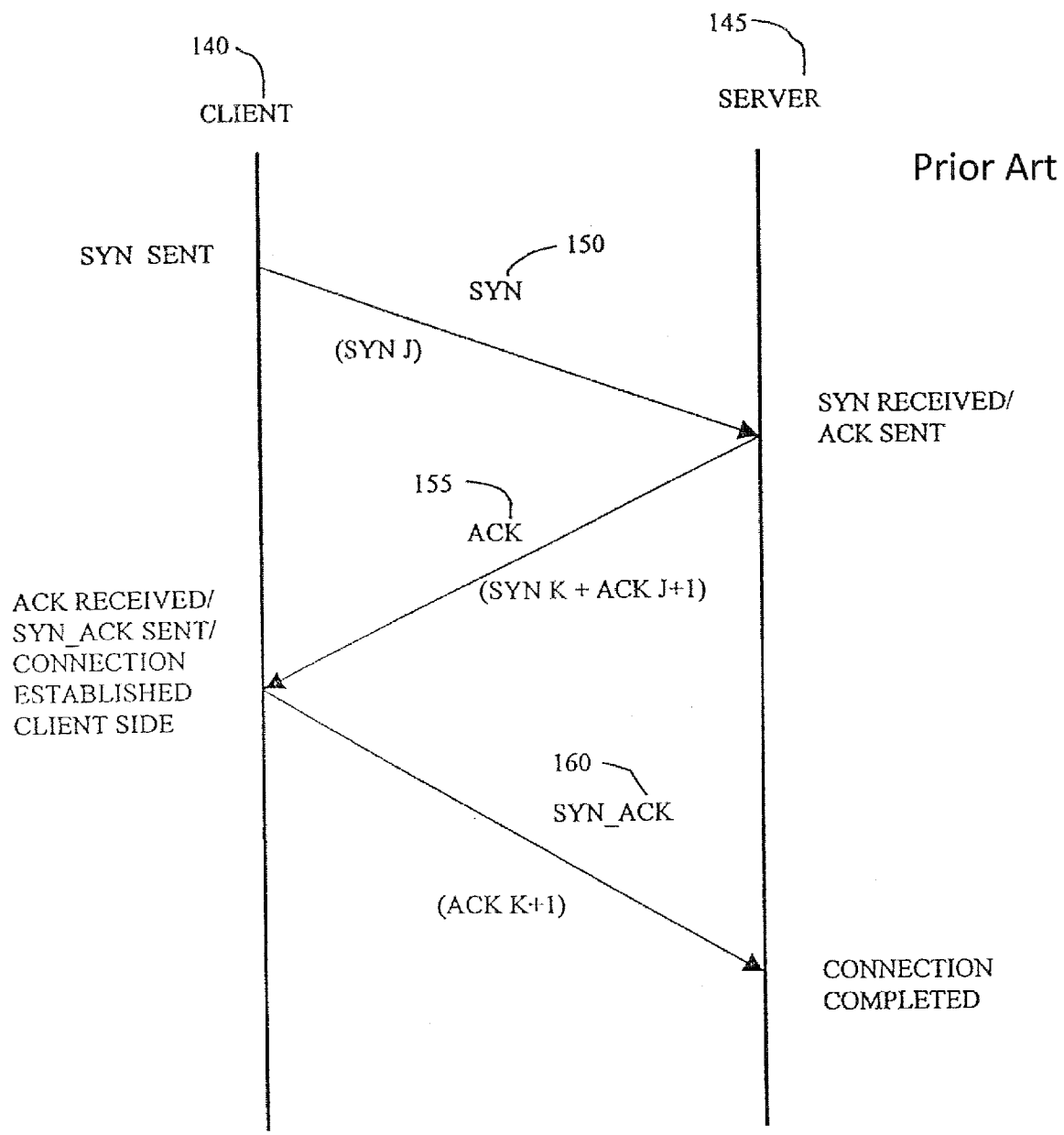
FIG. 2 is a line drawing showing the flow of operations between a client and a server during the establishment of a TCP connection according to conventional techniques.

FIG. 2 is a line drawing showing the flow of operations a conventional system between a client 140 and a server 145 during the establishment of a TCP connection. The TCP connection is opened by a three-part handshake. A connection is initiated by the client 30. The client 30 sends a SYN segment, referred to simply as a SYN 150, with a sequence number set to an arbitrary value (J). The server 20 responds with a second SYN segment with an acknowledgment number set to J+1 and the sequence number set to a further arbitrary value (K). This second segment is called an ACK 155. The client responds to the ACK 155 with a third segment where the acknowledgment number is set to K+1. This segment is called the SYN-ACK 160. At the completion of this handshake, the TCP connection between the client 140 and the server 145 is complete.

Figure 3:
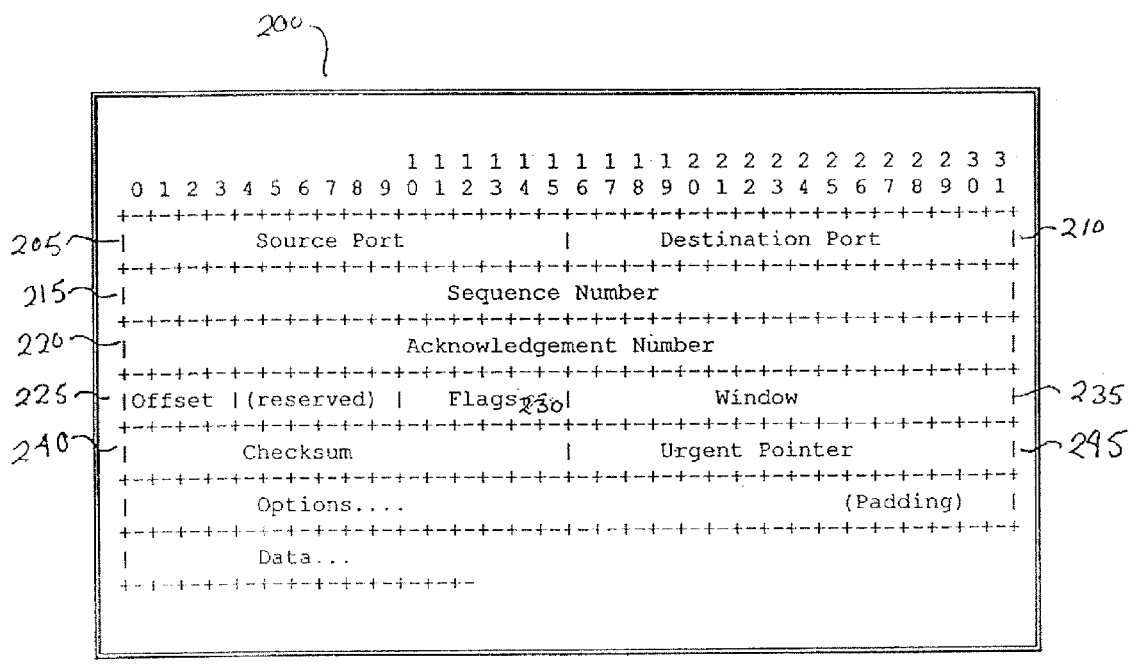
FIG. 3 is a block diagram of a typical TCP data segment according to conventional techniques.

FIG. 3 is a block diagram of a typical TCP segment 200. A data segment may also be referred to as a packet, frame or message. The fields of the TCP segment 200 are as follows.

The source port 205 and the destination port 210 identify the source and destination ports in order to identify the end-to-end connection protocol and higher-layer application. The source (and destination) port numbers are used for demultiplexing the data stream to applications. It is possible for there to be multiple simultaneous TCP data streams between two hosts. Therefore, a TCP data stream is uniquely identified by a group of four numbers. These are the two hosts addresses and the two port numbers. The source port number is used as destination in any reply to the segment.

The sequence number 215 contains the sequence number of the segment's first data byte in the overall connection byte stream. Since the sequence number refers to a byte count rather than a segment count, sequence numbers in contiguous TCP segments are not numbered sequentially.

The acknowledgment number 220 is used to acknowledge receipt of data. The acknowledgment number field indicates the sequence number of the next byte expected from the receiver.

The data offset 225 points to the first data byte in this segment. Accordingly, this field also indicates the segment header length.

The flags 230 are a set of control flags that control certain aspects of the TCP virtual connection. The flags include:

Urgent Pointer Field Significant (URG): When set, indicates that the current segment contains urgent (or high-priority) data and that the Urgent Pointer field value is valid.

Acknowledgment Field Significant (ACK): When set, indicates that the value contained in the Acknowledgment Number field is valid. This bit is usually set, except during the first message during connection establishment.

Push Function (PSH): Used when the transmitting application wants to force TCP to immediately transmit the data that is currently buffered without waiting for the buffer to fill; useful for transmitting small units of data.

Reset Connection (RST): When set, immediately terminates the end-to-end TCP connection.

Synchronize Sequence Numbers (SYN): Set in the initial segments used to establish a connection, indicating that the segments carry the initial sequence number.

Finish (FIN): Set to request normal termination of the TCP connection in the direction this segment is traveling; completely closing the connection requires one FIN segment in each direction.

The window 235 is used for flow control and contains the value of the receive window size which is the number of transmitted bytes that the sender of this segment is willing to accept from the receiver.

The checksum 240 provides a bit error detection for the segment (including the header and data).

The urgent pointer 245, valid when the URG flag is set, indicates the position of the first octet of nonexpedited data in the segment. Urgent data is information that has been marked as high-priority by a higher layer application. This data usually bypasses normal TCP buffering and is placed in a segment between the header and "normal" data.

Flow control is associated with the current byte sequence numbers at each end of the data flow. As described above, whenever a segment is sent, it includes the sequence number of the last byte sent. A segment also includes the sequence number of the next byte that the sending host expects to receive. This is the acknowledgment number (ACK). A host receiving a segment can assume that the remote host has safely received all bytes up to and including byte ACK-1, and local copies may then be discarded.

The difference between the number of the last byte sent and the acknowledgment number is known as the window. The maximum size of the window is advertised by a host as part of every TCP segment the host sends. A host can quench the flow of data from a remote host by advertising a window size of zero. Once a zero window size advertisement has been received, the remote host can no longer send data. A host may not send data with byte sequence numbers greater than the sum of the remote acknowledgment number and the remote window. Under normal circumstances the remote window can be thought of as a buffer where out-of-sequence segments are held temporarily awaiting the filling in of gaps in the sequence when delayed data turns up.

An "arbitrary" initial sequence number is required to increment approximately every 4 μs, this avoids delayed segments from a previous connection getting mixed up with a new connection. The initial sequence number will wrap in about 4½ hours. Once a connection is established the sequence numbers can wrap much more quickly depending on traffic and line speed.

Figure 4:
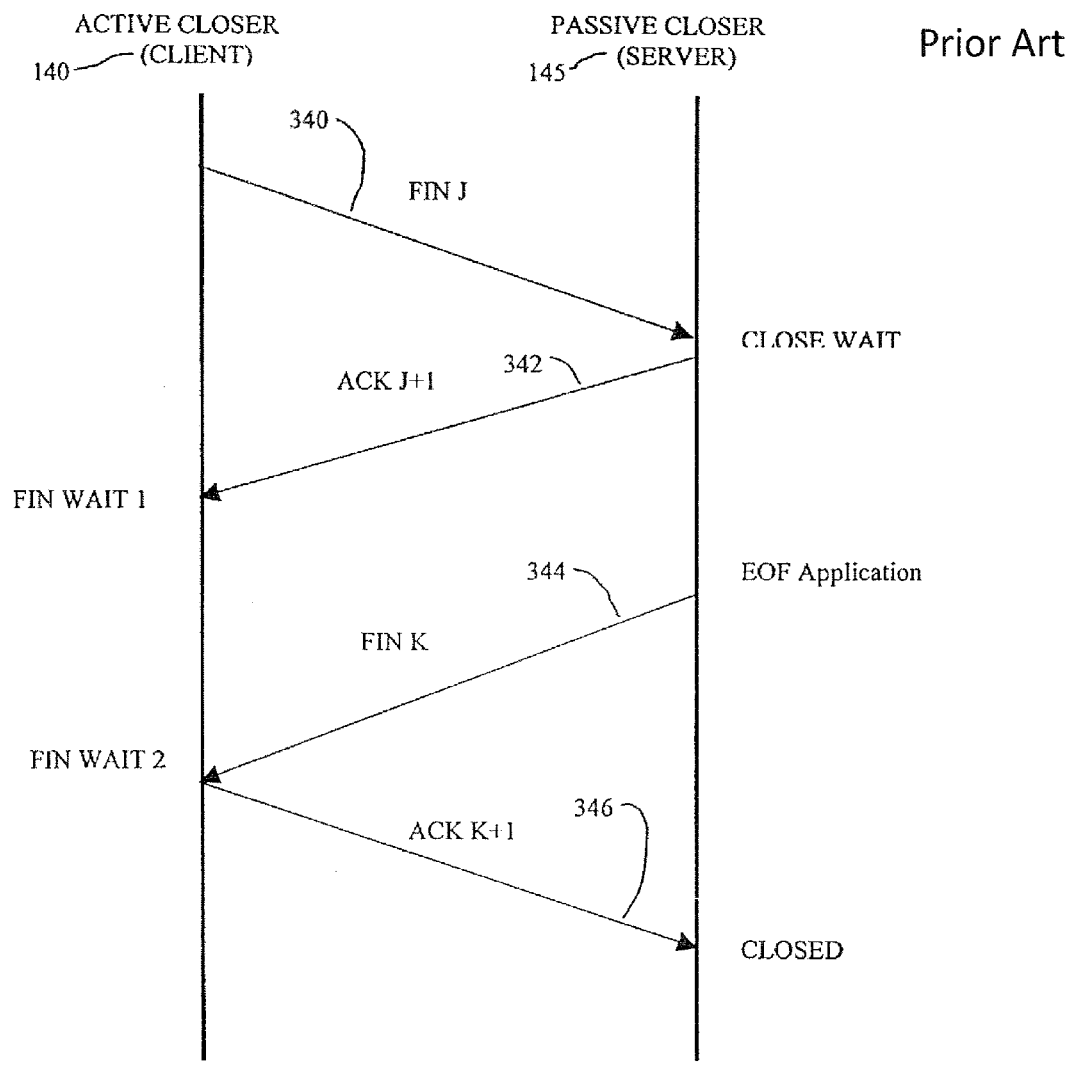
FIG. 4 is a line drawing showing the flow of operations during the closing of a TCP connection according to conventional techniques.

FIG. 4 shows the flow of operations between two systems, in this case, the client 140 and the server 145, to close down a TCP connection according to one conventional technique. Closing down a connection requires a four part exchange. At the active end, the client 140 initiates the closure sequence and sends an FIN segment 340 to the server 145. The server 145 responds with an ACK segment 342 to the client. At the passive end, receipt of a FIN segment prompts the server to send a second FIN 344 to the client. The client responds with a second ACK 346 closing the connection. The exchange is really two independent exchanges, and it is possible to close the connection in one direction but not the other.

Figure 6:
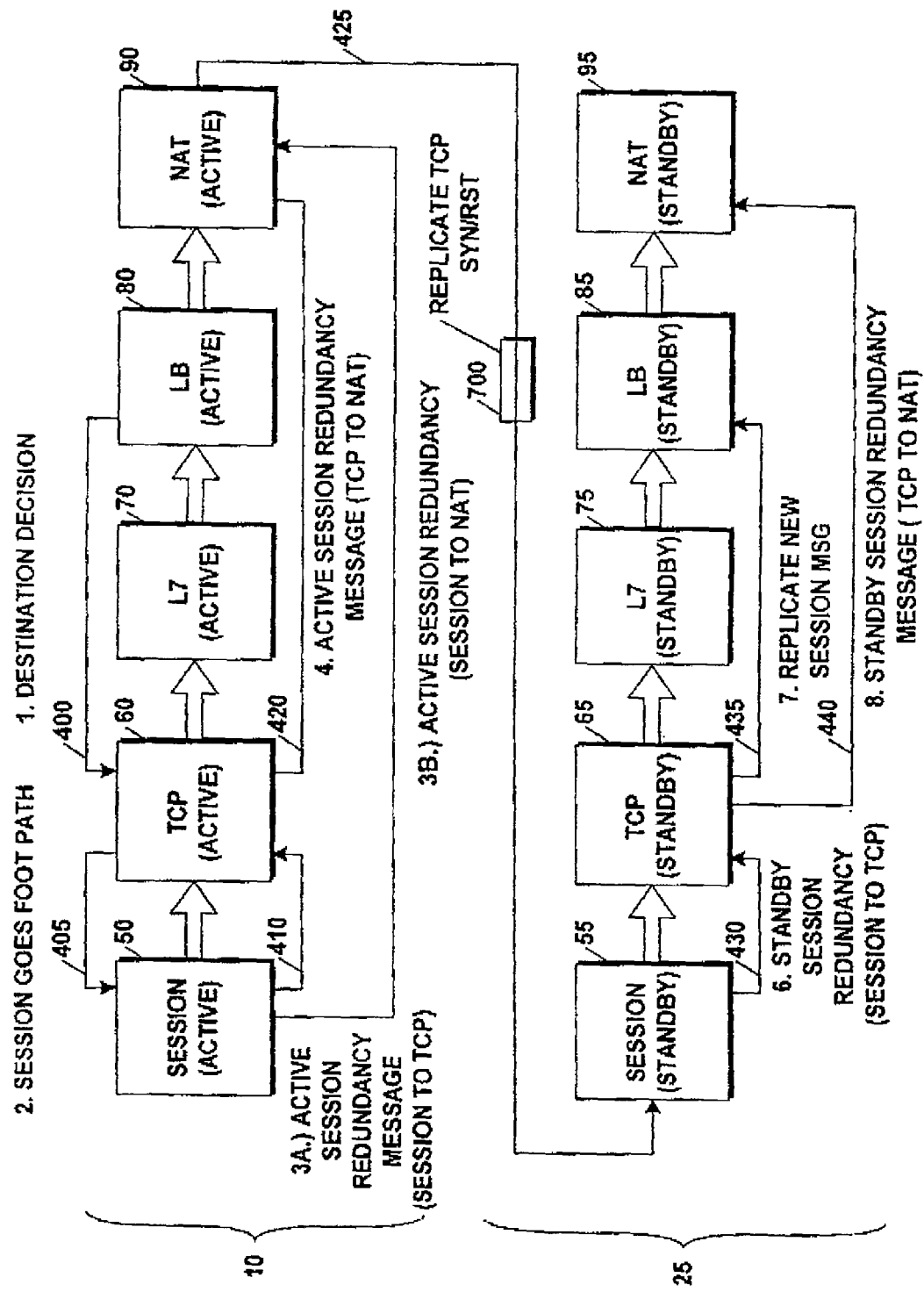
FIG. 6 is part block diagram, part flow diagram showing the flow of operations in the primary CSM and standby CSM of FIG. 1 to create the redundant connection according to principles of the invention.

In the present invention, upon receiving a destination decision message from LB (load-balancer), such as FIG. 6, the active CSM 20 transmits a replicate TCP SYN to the standby CSM 25 to replicate a connection state on the standby CSM 25. The replicate SYN is constructed to appear to originate from the client 30 originating the connection through the active CSM 20 to the server 31. The replicate SYN further includes encoded information enabling the standby CSM 25 to distinguish the replicate SYN from an actual SYN. In the present embodiment of the invention, this additional encoded information is based on the source Machine Address Code (MAC) and the private link 40 between the active CSM 20 and the standby CSM 25. All replication traffic arrives over the private link 40 and thereby serves as an alert to the standby CSM 25 that a data segment is a replication segment.

Figure 5:
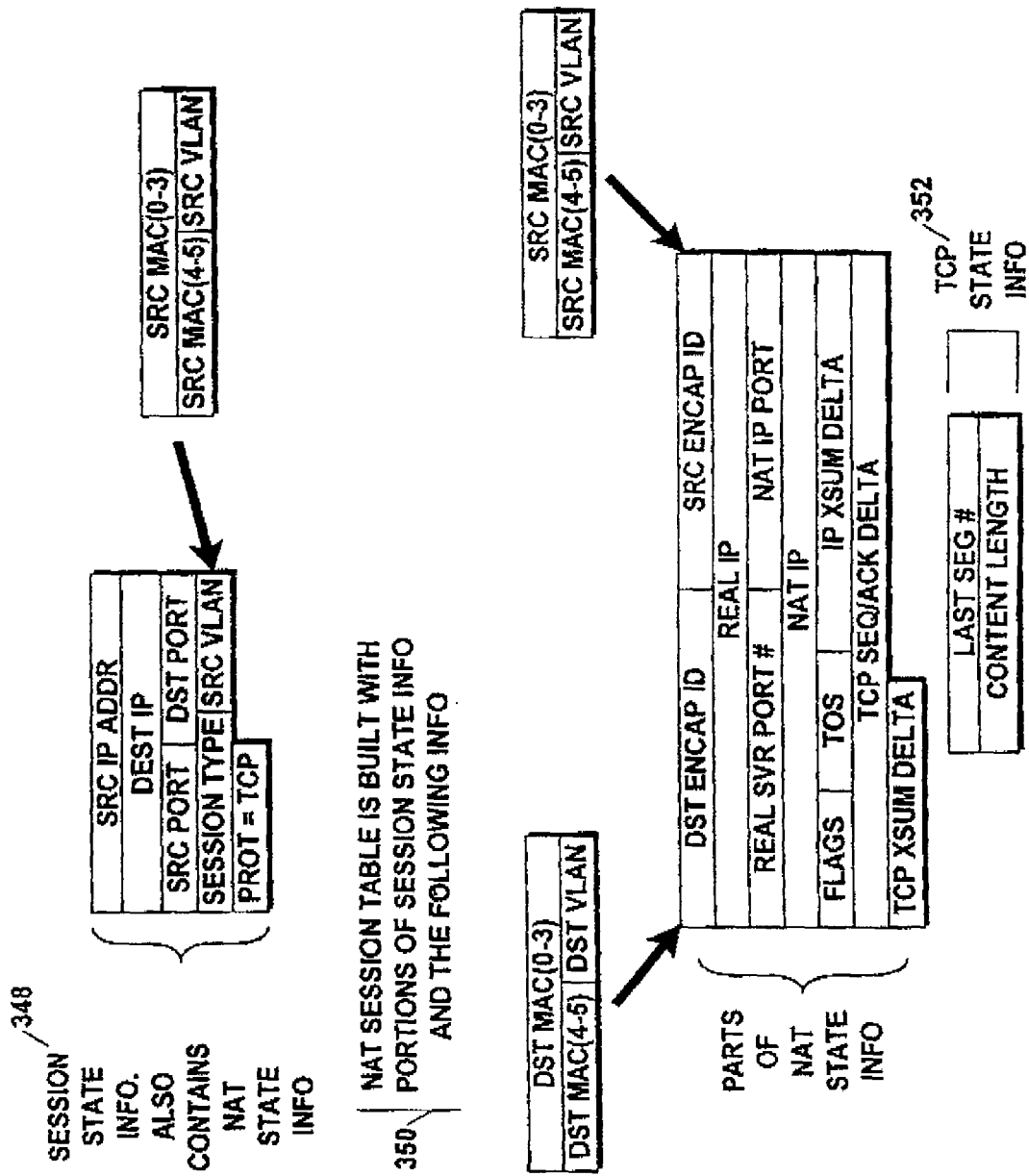
FIG. 5 is a block diagram of the state data typically used in creating a redundant connection according to principles of the present invention.

FIG. 5 shows the connection data that is typically communicated in a replicate SYN in order to replicate a connection according to principles of the present invention. Session state data 348, NAT state data 350, TCP state data 352, and LB data may be communicated to the standby CSM 25. The data communicated, however, depends upon the type of connection to be replicated. In order to identify and service any connection after it has failed over to the standby CSM, the standby CSM must have the session table 120 in the standby session module 55 and the NAT table 135 in the standby NAT module 95 set up correctly. If the connection is an HTTP 1.1 persistent connection, then the TCP module 65 also tracks some states. Additionally, the LB may track some LB states 130. In one embodiment of the invention, the LB 85 tracks the NAT port and NAT IP address allocation. The LB module 80 on the active CSM 20 allocates the IP address and port for nating a connection. The standby CSM 25 must track this connection or risk that the standby LB module 85 use the same IP address and port for nating another connection after failover.

As shown in FIG. 5, the session state data 348 includes the source IP address, destination IP address, source port, destination port, session type, source vlan, and protocol (in this case, TCP). The source vlan field further includes MAC information.

The NAT table 350 includes destination encapsulation ID, source encapsulation ID, real IP address, the real server port number, the NAT IP port, flags, type of service, the IP checksum delta, the TCP sequence/ACK delta, and the TCP checksum delta. The destination encapsulation ID further includes destination MAC data and destination vlan. The source encapsulation ID includes source MAC data and source vlan data.

The TCP table 352 includes last sequence number and content length.

The active session modules communicates the information shown in FIG. 5 from the active CSM 20 to the standby CSM 25 over a vlan 40 configured for this purpose. While it is possible to communicate all of the information, one embodiment of the invention does not include the locally administrated indices, e.g., the encaps ID, as the standby CSM can deduce that information from the other data it has available. This may alleviate the need for keeping a 16 bit encaps ID, for example, and makes this embodiment of the invention suitable for 1×N redundancy.

FIG. 6 shows the event flow and steps taken by the active CSM 20 and standby CSM 25 that establishes redundancy according to one embodiment of the invention. FIG. 6 will be used in relation to the discussion of FIGS. 7-15. To create a redundant connection in step 400, the active LB module 80 makes the decision that a particular connection must be replicated and sends a decision message to the active TCP module 60.

Figure 7:
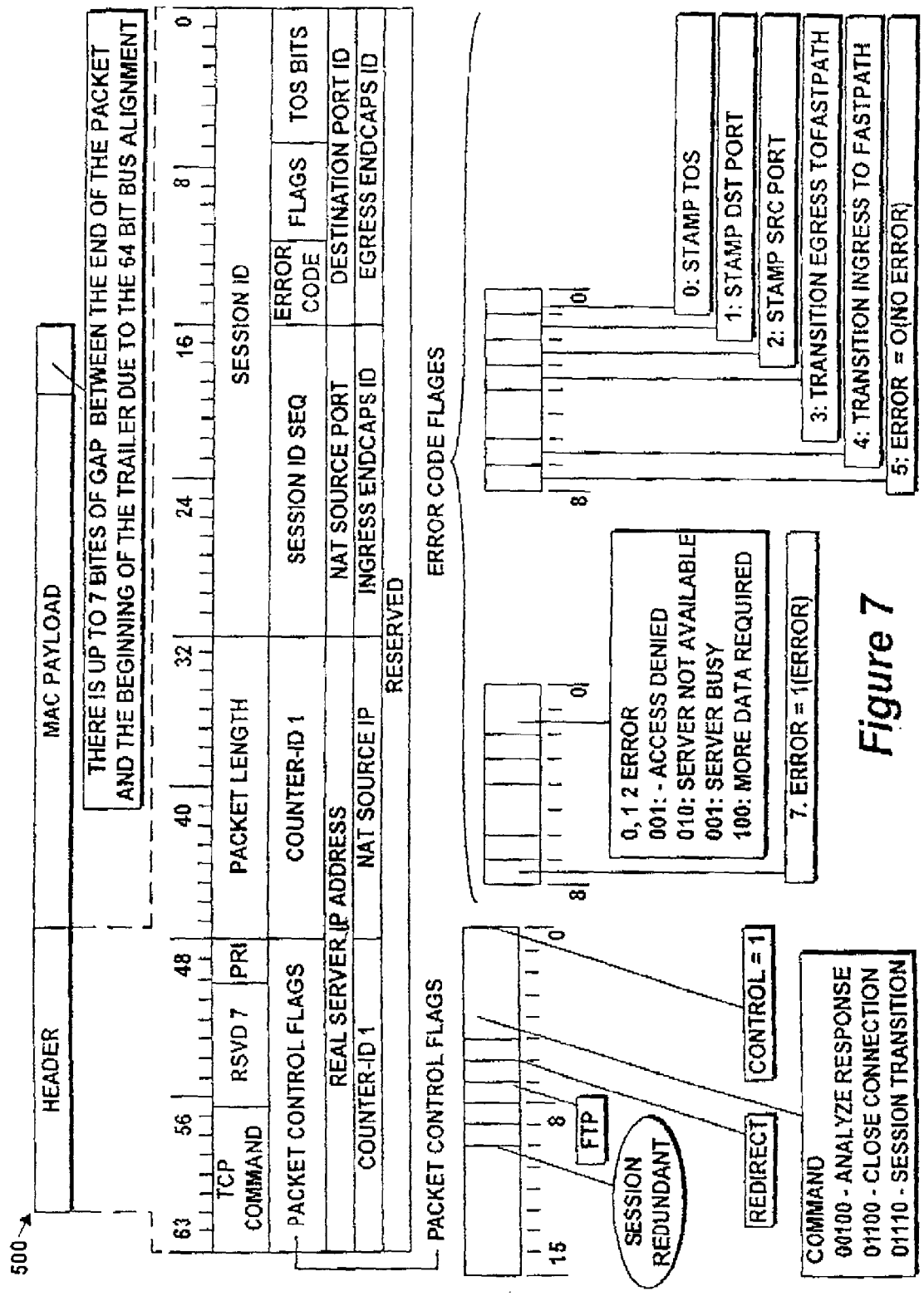
FIG. 7 is a block diagram of the format of shows of the decision message sent from the active LB module 80 to the active TCP module of FIG. 1 according to the process illustrated in FIG. 6.

FIG. 7 shows the format of the decision message 500 sent from the active LB module 80 to the active TCP module 60 in step 400 of FIG. 6. The decision message 500 uses a plurality of control flags 502 to indicate that a redundant connection is to be made and how the process of creating the connection should be executed. The active TCP module 60 parses the decision message 500 and signals the active session module 50, step 405 of FIG. 6, to replicate the connection via TCP-to-Session command queue, instructing the session module to execute the replication process over Layer 7. In the same message 500, the active TCP module 60 sets the session type field 550 in the session table correctly so that the session entry is marked as Redundant and needs to be replicated.

Figure 8:
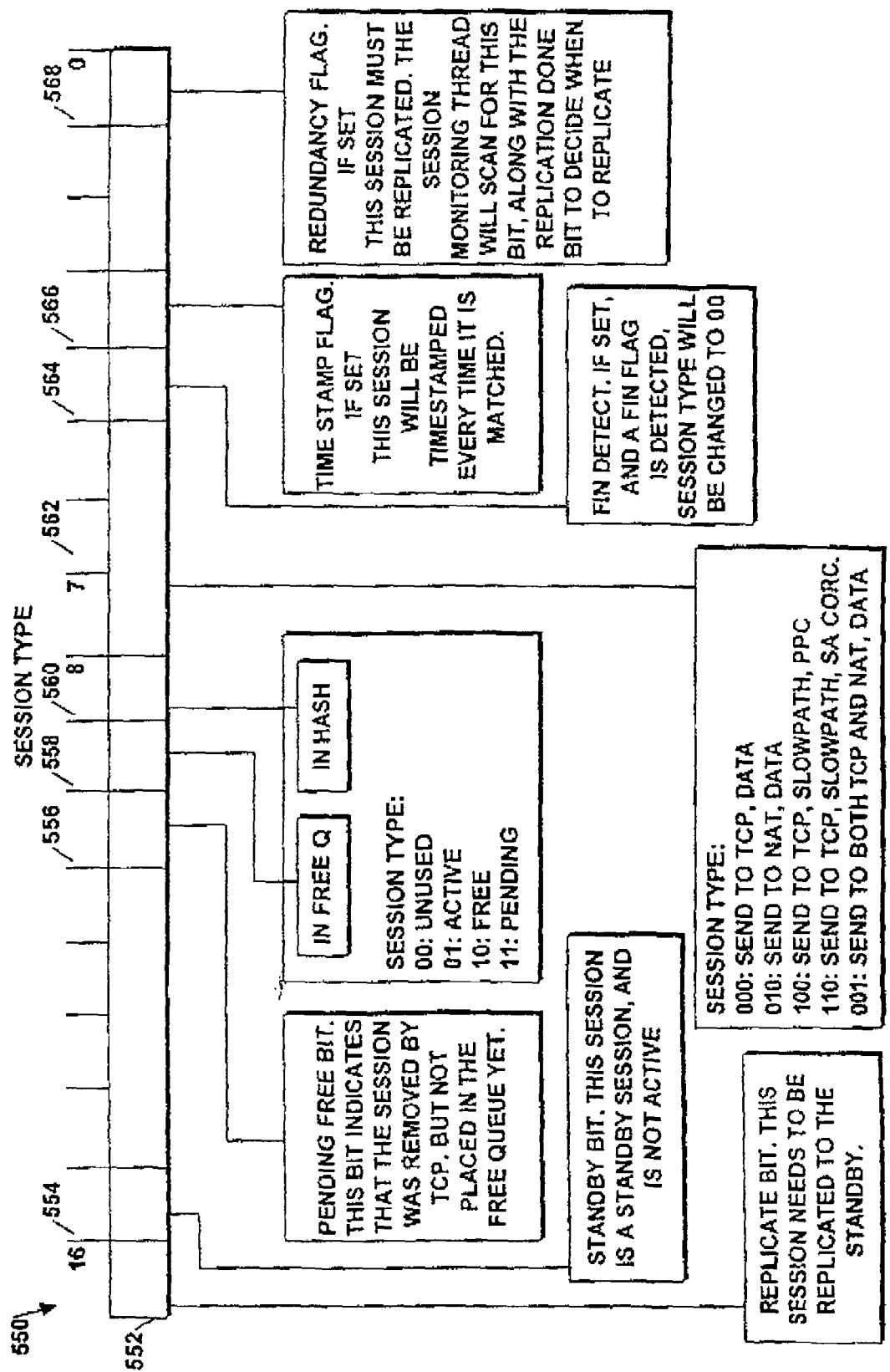
FIG. 8 is a block diagram of the session type portion of the table in the active session module of FIG. 6.

FIG. 8 shows the session type field 550 of the session table according to principles of the present invention. A session type field 550 has a replicate bit 552 to indicate that a connection (or "session") is to be replicated. A standby bit 554 indicates whether a session is an active session or a standby session. A pending free bit 556 indicates, when set, that a session was removed by the TCP module but not yet placed on a free queue. An "In Free Queue" field 558 and an "In Hash" field 560 indicate session type. A instruction field 562 indicates how and where the connection data is to be transmitted. A FIN detect flag 564 indicates whether a FIN flag for connection reset has been detected. A timestamp flag 566, when set, directs the session be timestamped each time it is detected. A redundancy flag 568 acts as an additional indicator that the connection needs to be replicated.

Figure 9:
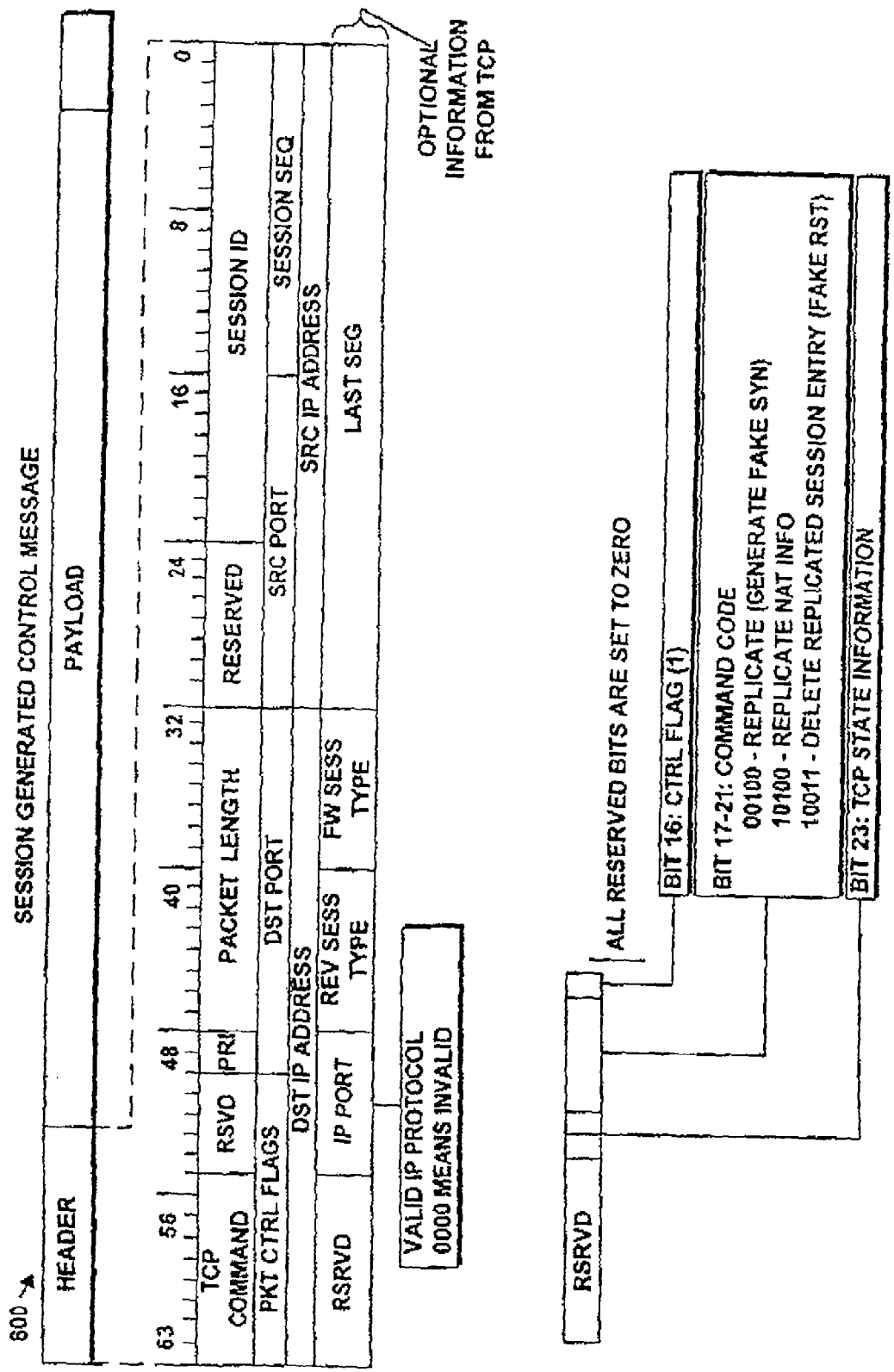
FIG. 9 is a block diagram of the control message format according to principles of the present invention.

Returning to FIG. 6, a session replication thread in the active session module 50 scans the session table 100 periodically (every 1 second in one embodiment of the invention) for redundant and active session entries, i.e., connection entries, that require replication. If a connection to be replicated is found, then the active session module 50 generates a control message 600. The format of the control message 600 is shown in FIG. 9. If the session type indicates that data goes only to NAT, then the control message is sent directly to the NAT module in step 415. Otherwise, the active session module 50 sends the control message 600 to the active TCP module 60, step 410. The active TCP module 60 (step 410) adds the corresponding TCP state to the control message 600. In one embodiment of the invention, the TCP state consists of the last sequence number and content length in case of an HTTP 1.1 persistent connection. The active TCP module sends the control message to the active NAT module in step 420.

The active NAT module 90 receives the control message 600 from the active session module (step 415) or the active TCP module (step 420). If the control message 600 is for session creation, then the active NAT module 90 generates a replicate SYN 700 which is sent to the standby CSM 25.

Figure 10:
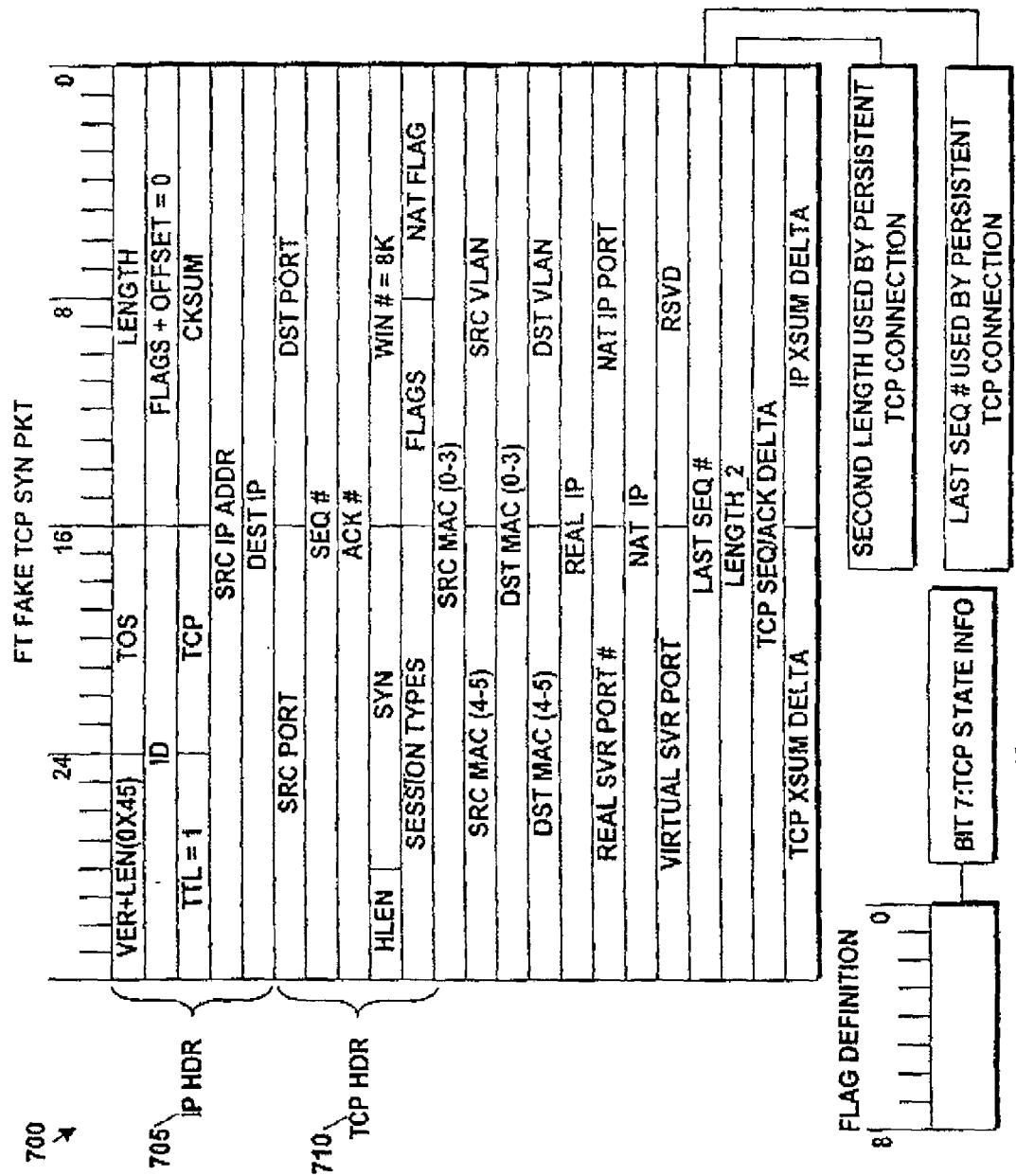
FIG. 10 a block diagram of the format of the replicate SYN according to principles of the present invention.

FIG. 10 shows the format of the replicate SYN 700. The replicate SYN 700 has the session information described above to replicate a particular connection in the standby CSM 25. The IP 705 and TCP 710 headers of the replicate SYN 700 are set in a way to cause the standby CSM to create a replicate session entry. The replicate SYN 700 also carries the information required to build a replica of the current session entry as described with regard to FIG. 5. In addition, the replicate SYN 700 has an indicator in the MAC header that the SYN is a replicate.

Figure 11:
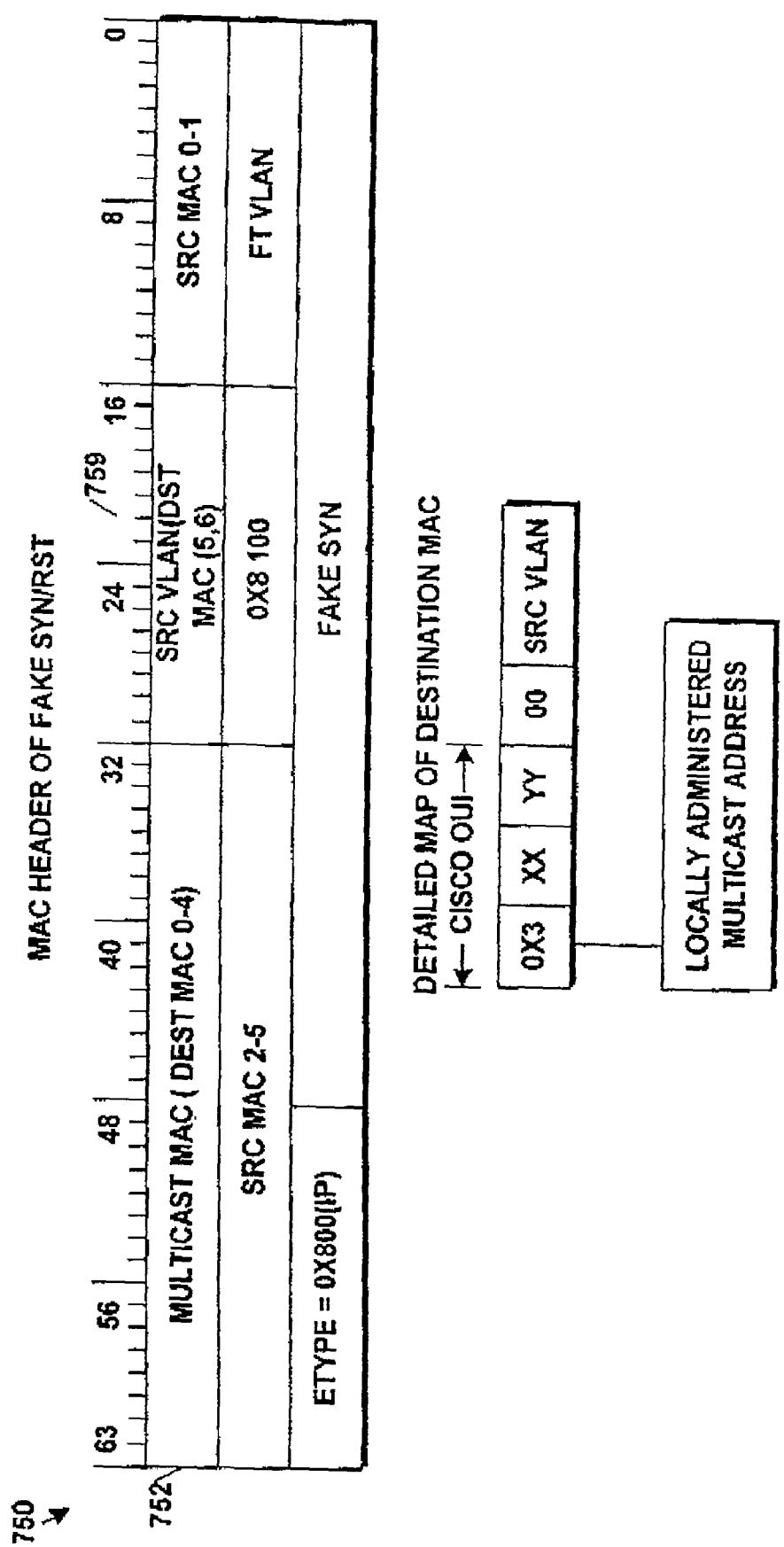
FIG. 11 is a block diagram of the format of the MAC header in the replicate SYN of FIG. 10.

FIG. 11 shows a MAC header 750 of a replicate SYN segment. A multicast destination field 752 is the indicator used in the present embodiment of the invention to indicate that the segment is a replicate SYN. The active CSM sends the replicate SYN 700 over the vlan, step 425 of FIG. 6.

When the standby CSM 25 receives the replicate SYN 700, the session classifier of the standby session module 55 recreates the forward session table (client to virtual server). The standby session module uses most of its regular session creation code path because the replicate packet 700 is treated as a TCP SYN packet. The replicate SYN frame also contains a data portion (TCP data), which has additional state information required by other modules (TCP, Load Balancer, and NAT). The modules following the session module 55 then identify the incoming control messages as part of the replicate SYN 700 and program their respective states 120, 125, 130, 135 to mirror the connection tables 100, 105, 110, 115 of the respective equivalent active module in almost the same way as a regular packet. In one embodiment of the invention, the state information also does not carry any locally computed state of active connection table, e.g., any indices or other local references. There is enough information for each standby module to compute all the rest of the state information required by the standby CSM. This avoids replicating any other ancillary data structures, etc. to support connection replication.

The replicate SYN 700 and RST packets are stamped with a monotonically increasing sequence number in the sequence number field. This enables the standby CSM 25 to detect and drop and stale packets. In an alternative embodiment of the invention, an ACK/NACK scheme may be used to increase the transmission reliability. In one embodiment of the invention, the IP and TCP checksums are not calculated and assumes the small frames are correctly protected by Ethernet CRC generation and checking.

Figure 12:
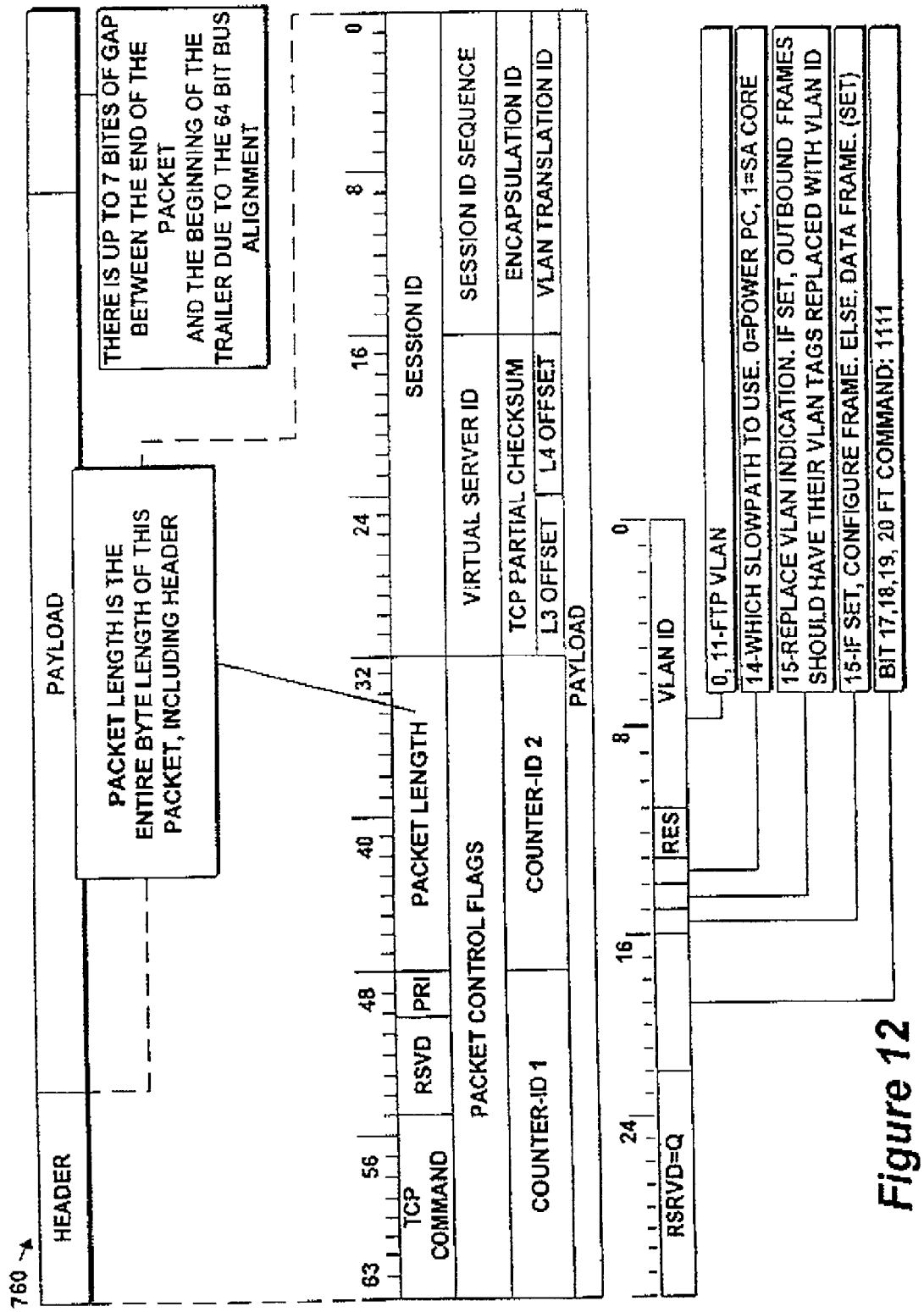
FIG. 12 a block diagram of the session lookup frame according to principles of the present invention.
Figure 13:
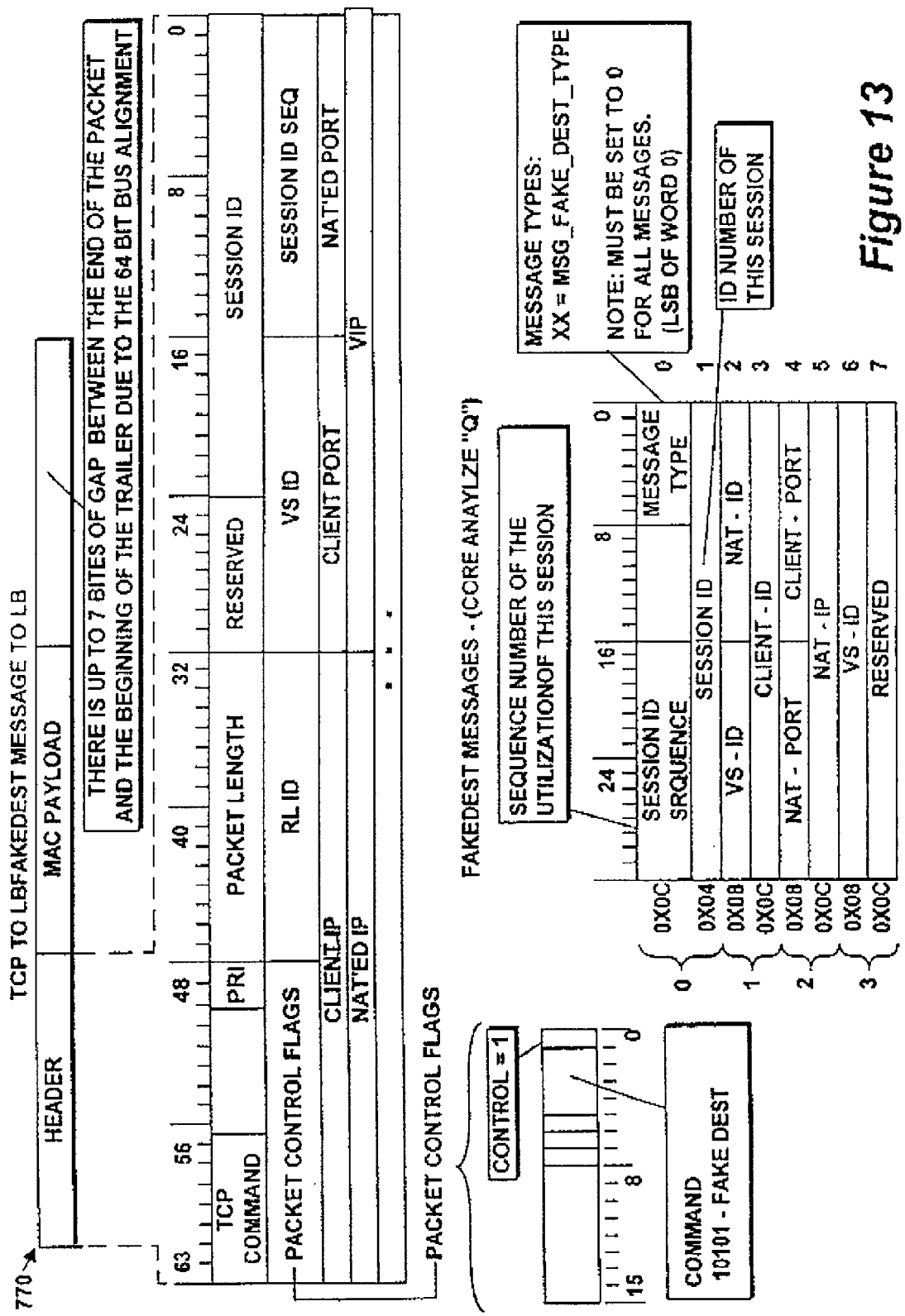
FIG. 13 is a block diagram of a command to replace a portion of the replicate SYN frame of FIG. 10 with a control header.

In one embodiment, the standby session module 55 detects the incoming packet as a replicate SYN 700 based on two factors. First, the SYN 700 is a TCP type packet arriving over the private link between the active CSM and the standby CSM. Second, the destination MAC address of the replicate packet 700 is Multicast as shown in FIG. 11. Since the TCP checksum is not included in the replicate packet, the replicate packet fails any checksum verification. The standby session module, however, knows not to discard the replicate packet for the above two factors. The standby session module determines the original source vlan from the replicate destination MAC address 754 and uses the vlan information along with the IP tuple (dest addr, dest port, protocol) for session lookup. A new session is created if there is no match. The standby session module 55 marks the new entry to its session table 120 as Redundant and Standby. The standby session module 55 also uses a special long timeout value for this entry. The active CSM 25 always marks the session entry as Active. The standby session module 55 uses the encoded vlan information, not the private link vlan on which the replicate SYN packet arrived, to match and create sessions. Returning to FIG. 6, all replicate packets, including replicate SYN that matched a session entry, are forwarded to standby TCP module in step 430 in FIG. 6. The standby session module indicates a replicate frame by setting the control bit and the appropriate command bits in a packet control flag (01111). FIG. 12 shows an example of the session lookup frame 760.

The standby TCP module 65 receives the replicate SYN 700 in step 430 in FIG. 6. This packet is sent to TCP's ingress FIFO as well as packet FIFO, just as a non-replicated data packet would be. The encapsulation ID and partial checksum is not valid in this message, however the standby TCP module 65 validates the replicate SYN 700 by comparing the sequence number of the received frame with the currently expected sequence number. All packets with lower sequence number than the expected number are be rejected. This procedure guards against packet reordering.

In this example, the standby TCP module 65 uses the MAC/vlan pair to do an encaps-id lookup for both ingress(0) and egress(1). The standby TCP module 65 uses the encaps-id and other information from the replicate SYN to generate a control frame including replicate destination data for the standby NAT module. The standby TCP module 65 then sends a command to strip 80 bytes off of the session header and replicate SYN frame and inject the control header as shown at 770 in FIG. 13.

The standby TCP module 65 then programs the forward session tuple with correct session type. The standby TCP module also programs the reverse session tuple and supplies correct session type, vlan (encaps-id) with the information provided with the replicate SYN. It also marks this entry as Redundant. Session code in turn marks this session entry as Standby. The reverse tuple programming as described above is accomplished in one single command to the standby session 65.

Finally the standby TCP module must program itself with an IP address and a port (src ip, src ip port, real ip, real ip port). If TCP state information bit is set, then the standby TCP module programs itself with HTTP 1.1 persistent state information. The standby TCP module 65 then, in step 435 in FIG. 6, may send a PortSync message to the LB module 85 if "NATing" is enabled as shown by NAT flags. After that, the standby TCP module 55 generates a control header, strips off a number of bytes, for example, 102 bytes, of the replicate SYN frame queued up in the ingress FIFO and injects a control message (step 440) to NAT with the new control header.

In this example, the active and the standby CSMs 20, 25 keep the NAT port allocation in synchronization in order to work correctly after a failover. The standby TCP module 65 generates a TCP to NAT message in step 440 of FIG. 6 to carry the NAT information to the NAT module 95 so that the standby system can track the NAT IP and port allocation of active CSM.

Figure 14:
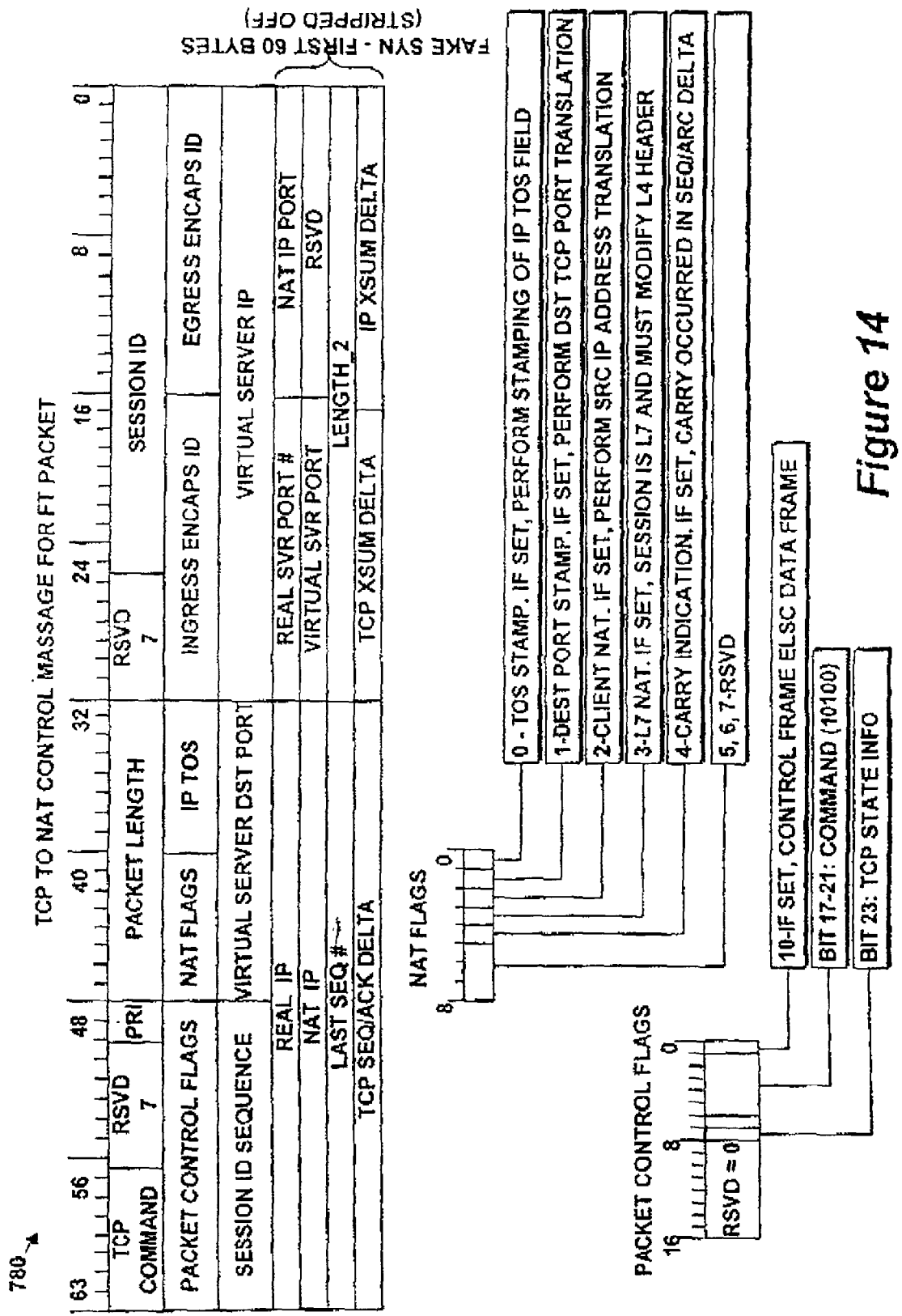
FIG. 14 a block diagram of a TCP to NAT control message.

As shown if FIG. 14, the standby Session Redundancy message 770 (TCP to NAT) includes all information required to set up NAT session table on the standby CSM. In addition, this message contains information to keep the LB state in synchronization. So every time the standby TCP module 65 receives a replicate SYN 700 with new session bit set, the standby TCP module 65 creates a replicate new session message and that is forwarded to the standby LB module 85. This also keeps some of the statistics (e.g., connection count etc.) in synchronization between replica in a fault tolerant group.

Once created, the basic requirement for a standby entry is to drop all traffic for the connection so that no data traffic is forwarded. After a switchover from the active CSM 20 to the standby CSM, all standby connections are marked active and allowed to service and forward traffic.

Figure 15:
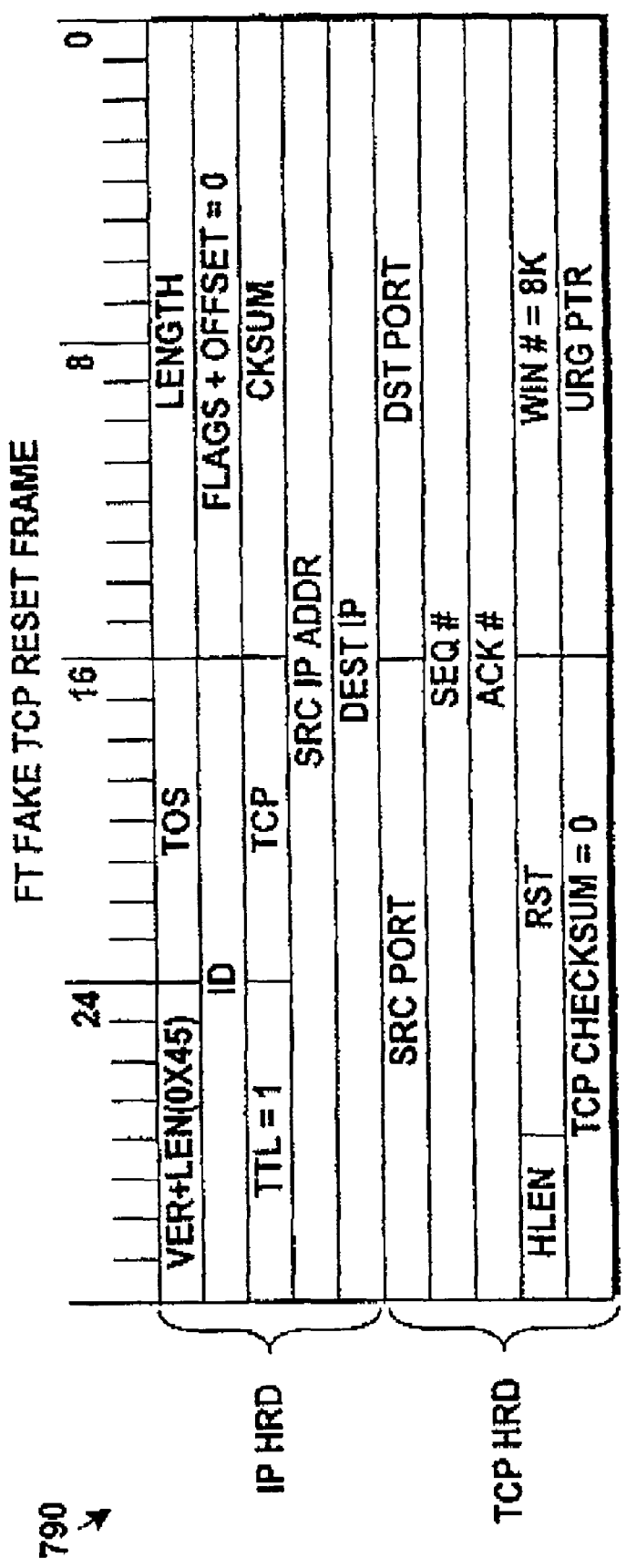
FIG. 15 a block diagram of a replicate RST message according to principles of the present invention.

FIG. 15 shows a replicate RST segment 790. Once the original connection is closed, the active CSM 20 transmits a replicate RST 790 to the standby CSM 25 to tear down the replicate connection. The replicate RST is made to appear to originate from the client 30 and not the active CSM 20. The replicate RST segment 790 is treated almost as any regular TCP RST.

Just like the replicate SYN 700, the active CSM 20 generates a replicate TCP reset frame 790 when a replicated session entry needs to be torn down. First, the initiator (client 30) sends a FIN or RST to the server 31 to close its end of connection through the active CSM 20. The active TCP module 60 goes through normal processing and instruct the session 50 to remove this entry from session table 100. Again, the replication thread in the session module 50 sends a replication control message 780 to the NAT module 90 with a delete command. Once the NAT module 90 receives this control frame 780, it generates the replicate reset frame 790 and sends it to the standby CSM 25 using a MAC header described before. The session 55 in the standby CSM 25 receives this RST 790, classifies it as a fault tolerant state packet and passes it to the standby TCP module 65. The standby TCP module 65 tears down the redundant session entry using the normal code path and sends an END Session message to the standby LB module 85. If the standby LB module 85 has previously received a replicate new session message, this will free up the NAT port. In an alternative embodiment of the invention, it will also decrement the connection count for real service.

In the event of lost replicate RSTs 790, the standby CSM might leak a session entry. Eventually this leak could cripple the standby CSM 25. To deal with the problem of lost replicate RSTs 790 in one embodiment of the invention, each replicated connection has a timed life on the standby CSM 25. A timeout value for a standby connection is, for example, 30 minutes. The active CSM 25 is programmed to send refresh messages to the standby CSM periodically (for example, every 5 minutes). Each refresh message renews the life of the connection. The refresh message needs only enough information to communicate to the standby session module that a connection is still valid. The session module, upon receiving a refresh message, increments the timeout value and drops the refresh message. It is not necessary for the standby TCP module 65 to receive the refresh message. If an entry is torn down on active and the standby missed the corresponding replicate RST then the standby entry will eventually time out and clear out.

In an alternative embodiment, each connection have a defined life time that is never lengthened.

In alternative embodiments of the invention, there is a private link between the session module and NAT module of the CSM so that the TCP module may be bypassed in establishing connections.

In alternative embodiments of the invention, non-TCP protocols are replicated. An example of a non-TCP protocol that may be used is UDP.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device comprises at least one communications interface (e.g., a network interface), a memory (e.g., any type of computer readable medium, storage or memory system), a processor and an interconnection mechanism connecting the communications interface, the processor and the memory. In such embodiments, the memory system is encoded with a connection replication system that when performed on the processor, produces a process that causes the computer system to perform any and/or all of the method embodiments, steps and operations explained herein as embodiments of the invention. In other words, a computer, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured with a connection replication system that operates as explained herein is considered an embodiment of the invention. More particularly, a computer program product is disclosed which has a computer-readable medium including computer program logic encoded thereon that, when executed on at least one processor with a computerized device, causes the processor to perform the operations (e.g., the methods) indicated herein is considered an embodiment of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method, comprising:
providing a content switch comprising a first content switch module and a second content switch module linked to each other, wherein each content switch module is configured to manage network traffic to perform server load balancing; and
maintaining connectivity between a client and the content switch when a first connection between the client and the first content switch module is lost, comprising:
creating a replication request message by operation of one or more computer processors and in response to the first connection between the client and the first content switch module, wherein creating the replication request message includes creating a replicate Transmission Control Protocol (TCP) synchronize (SYN) packet that appears to the second content switch as if the replicate TCP SYN packet originated from the client and that allows the second content switch module to distinguish the replicate TCP SYN packet from a standard TCP SYN packet on the basis of information encoded in the replicate TCP SYN packet, wherein the encoded information is based on a source Machine Address Code (MAC) of the first content switch module and a private link between the first content switch module and the second content switch module, wherein creating the replicate TCP SYN packet includes providing connection state replication data in the replicate TCP SYN packet, wherein the connection state replication data includes at least one of, session state data, network address translation (NAT) state data, TCP state data, and load balancing data;

transmitting the replication request message from the first content switch module to the second content switch module; and creating a second connection in the second content switch module, wherein the second connection is a replication of the first connection.

2. The method of claim 1, further comprising:
establishing a time-out period for a second connection state; and
sending a refresh message periodically to maintain the second connection.

3. The method of claim 2, further comprising updating the timeout period in response to the refresh message.

4. The method of claim 1, further comprising determining whether the first connection should be replicated before creating the replication request message.

5. The method of claim 1, further comprising determining whether the first connection should be replicated before creating the replication request message, and wherein determining whether the first connection should be replicated comprises:
scanning a session table in a session module of the first content switch module to determine if any session entries in the session table are marked as needing replication.

6. The method of claim 5, further comprising:
generating a control message for session creation, wherein the control message includes connection state data corresponding to the first connection and causes the replication request message to be created.

7. The method of claim 1, and wherein the replication request message is transmitted over the private link.

8. The method of claim 1, further comprising:
closing the first connection;
transmitting a replicate reset message to the second content switch in response to the first closed connection; and
tearing down the second connection in response to the replicate reset message.

9. The method of claim 1, wherein creating a replication request message comprises including a replication identifier.

10. The method of claim 1, wherein the content switch includes a plurality of modules, each module maintaining data about established connections,
and wherein the second connection is created using the connection state data from the replication request message using the connection state data from the replication request message.

11. The method of claim 1, wherein the second connection is created in response to receiving, at the second content switch module, the replication request message.

12. A method for generating a replication command to replicate a connection for fault tolerance in a content switch, comprising:
detecting a connection, from a client, needing replication in the content switch, wherein the content switch comprises a first content switch module and a second content switch module linked to each other;

by operation of one or more computer processors and creating a replication request message containing data for replicating said connection, wherein creating the replication request message includes creating a replicate Transmission Control Protocol (TCP) synchronize (SYN) packet that includes at least one of, session state data, network address translation (NAT) state data, TCP state data, and load balancing data, wherein the replicate TCP SYN packet is created to appear to originate from the client and to be distinguishable from a standard TCP SYN packet on the basis of information encoded in the replicate TCP SYN packet, wherein the encoded information is based on a source Machine Address Code (MAC) of the first content switch module and a private link between the first content switch module and the second content switch module; and transmitting said replication request message to a second switch, said second switch configured to, upon receiving said replication request message, establish a replicate connection.

13. The method of claim 12, further comprising periodically sending connection refresh messages to the second switch to maintain the replicate connection.

14. The method of claim 12, further comprising:
detecting a reset message for the connection; and
transmitting a replicate reset message to the second content switch in response to the reset message,
wherein the second content switch is notified to detect a status of the replicate connection, the status being one of: the replicate connection is torn down and the replicate connection is not torn down.

15. The method of claim 12, wherein creating a replication request message comprises including a replication identifier.

16. The method of claim 15, further comprising:
creating a second replication request message including a second replication identifier; and
transmitting the second replication request message to a second switch, the second switch being configured to, upon receiving the second replication request message, establish a second replicate connection.

17. A method for replicating, in a standby content switch, a connection between a client and an active content switch, comprising:
receiving a connection request message;
by operation of one or more computer processors, determining whether the connection request message is a replication request message, wherein the replication request message includes a replicate Transmission Control Protocol (TCP) synchronize (SYN) packet that includes replication data including at least one of, session state data, network address translation (NAT) state data, TCP state data, and load balancing data, wherein the replicate TCP SYN packet appears to originate from the client and is distinguishable from a standard TCP SYN packet on the basis of information encoded in the replicate TCP SYN packet, wherein the encoded information is based on a source Machine Address Code (MAC) of the active content switch and a private link between the active content switch and the standby content switch; and selectively creating a replicate connection in the standby content switch upon determining that the connection request message is a replication request message, wherein the replicate connection depends, at least in part, on data in the connection request message.

18. The method of claim 17, further comprising establishing a timeout period for the replicate connection.

19. The method of claim 17, further comprising:
   receiving a replicate reset message for the replicate connection; and
   tearing down the replicate connection in response to the replicate reset message.

20. A fault tolerant switch, comprising:
   a first module to determine whether a connection to a client should be replicated;
   a second module to set a replication indicator for a connection to be replicated; and
   a third module to detect said replication indicator, and in response, said third module to create a replication request message and to transmit said replication request message to a second switch, wherein the replication request message includes a replicate Transmission Control Protocol (TCP) synchronize (SYN) packet that includes connection state replication data including at least one of, session state data, network address translation (NAT) state data, TCP state data, and load balancing data, wherein the replicate TCP SYN packet appears to originate from the client and is distinguishable from a standard TCP SYN packet on the basis of information encoded in the replicate TCP SYN packet, wherein the encoded information is based on a source Machine Address Code (MAC) of the fault tolerant switch and a private link between the fault tolerant switch and the second switch, whereby a replicate connection is created at said second switch.

21. A connection replication switch for replicating a connection between a client and an active module of the connection replication switch, comprising:
   a plurality of standby modules, comprising:
      a first standby module to receive a replication request message, where the replication request message includes a replicate Transmission Control Protocol (TCP) synchronize (SYN) packet that includes replication data including at least one of, session state data, network address translation (NAT) state data, TCP state data, and load balancing data, said first module to read replication data from said replication request message, wherein the replicate TCP SYN packet appears to originate from the client and is distinguishable from a standard TCP SYN packet on the basis of encoded information in the replicate TCP SYN packet, wherein the information encoded is based on: (i) a source Machine Address Code (MAC) of the active module and (ii) a private link between the active module and at least one of the plurality of standby modules;
      a second standby module to generate control information in response to said replication data; and
      a third standby module to create and maintain a replicate connection state in said connection replication switch in response to said control information.

22. A connection replication switch for replicating a connection to a client, comprising:
   means for receiving a connection request message;
   means for determining whether said connection message is a replication request message, wherein the replication request message includes a replicate Transmission Control Protocol (TCP) synchronize (SYN) packet that includes connection state replication data including at least one of, session state data, network address translation (NAT) state data, TCP state data, and load balancing data, wherein the replicate TCP SYN packet appears to originate from the client and is distinguishable from a standard TCP SYN packet on the basis of information encoded in the replicate TCP SYN packet, wherein the encoded information is based on a source Machine Address Code (MAC) in the connection replication switch and a private link in the connection replication switch; and
   means for creating a replicate connection in response to replication data in said connection request message if said connection message is a replication request message.

23. The connection replication switch of claim 22, further comprising means for establishing a time-out period for the replicate connection.

24. The connection replication switch of claim 22, further comprising:
   means for receiving a replicate reset message for the replicate connection; and
   means for tearing down the replicate connection in response to the replicate reset message.

25. A computer program product having a non-transitory computer-readable medium including computer program logic encoded thereon that, when performed on a computer system having a coupling of a memory, a processor, and at least one communications interface, provides a method for generating a replication command for fault tolerance in a content switch by performing the operations of:
   detecting a connection to a client, needing replication in the content switch;
   creating a replication request message containing data for replicating said connection, wherein the replication request message includes a replicate Transmission Control Protocol (TCP) synchronize (SYN) packet that includes connection state replication data including at least one of, session state data, network address translation (NAT) state data, TCP state data, and load balancing data, wherein the replicate TCP SYN packet appears to originate from the client and is distinguishable from a standard TCP SYN packet on the basis of information encoded in the replicate TCP SYN packet, wherein the encoded information is based on a source Machine Address Code (MAC) of the content switch and a private link between the content switch and a second switch; and
   transmitting said replication request message to the second switch, said second switch configured to, upon receiving said replication request message, establish a replicate connection.

26. A computer program product having a non-transitory computer-readable medium including computer program logic encoded thereon that, when performed on a computer system having a coupling of a memory, a processor, and at least one communications interface, provides a method replicating, in a standby content switch, a connection between a client and an active content switch by performing the operations of:
   receiving a connection request message;
   determining whether said connection request message is a replication request message, where the replication request message includes a replicate TCP SYN packet that includes connection state replication data including at least one of, session state data, NAT state data, TCP state data, and load balancing data, wherein the replicate TCP SYN packet appears to originate from the client and is distinguishable from a standard TCP SYN packet on the basis of information encoded in the replicate TCP SYN packet, wherein the encoded information is based on a source MAC of the active content switch and a private link between the active content switch and the standby content switch; and creating a replicate connection in response to replication data in said connection request message if said connection request message is a replication request message.

27. A computer-implemented method, comprising:

creating a replication request message by operation of one or more computer processors and in response to a first connection in a first content switch module, wherein creating the replication request message includes creating a replicate Transmission Control Protocol (TCP) synchronize (SYN) packet that appears as if the replicate TCP SYN packet originated from the client to which the first content switch module is connected via the first connection, wherein creating the replicate TCP SYN packet comprises:

providing connection state replication data in the replicate TCP SYN packet, wherein the connection state replication data includes at least one of session state data, network address translation (NAT) state data, TCP state data, and load balancing data; and providing information encoded in the replicate TCP SYN packet enabling the second content switch module to distinguish the replicate TCP SYN packet from a standard TCP SYN packet, wherein the encoded information is based on a source Machine Address Code (MAC) of the first content switch module and a private link between the first content switch module and a second content switch module;

transmitting the replication request message to the second content switch module; and creating a second connection in the second content switch module, wherein the second connection is a replication of the first connection.

* * * * *